United States Patent
Wong et al.

(10) Patent No.: US 8,675,964 B2
(45) Date of Patent: Mar. 18, 2014

(54) IMAGE FUSION USING INTENSITY MAPPING FUNCTIONS

(75) Inventors: Earl Q. Wong, Vallejo, CA (US); Steven D. Hordley, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/490,259

(22) Filed: Jun. 6, 2012

(65) Prior Publication Data
US 2013/0330001 A1 Dec. 12, 2013

(51) Int. Cl.
*G06K 9/00* (2006.01)

(52) U.S. Cl.
USPC ............................ 382/168; 382/162; 382/274

(58) Field of Classification Search
USPC .......... 382/168, 162, 130, 274, 299; 358/461; 345/426, 589, 606; 348/E5.035; 128/922; 600/407
See application file for complete search history.

(56) References Cited

U.S. PATENT DOCUMENTS

| | | | |
|---|---|---|---|
| 6,611,615 B1* | 8/2003 | Christensen | 382/130 |
| 7,349,574 B1* | 3/2008 | Sodini et al. | 382/168 |
| 7,522,781 B2* | 4/2009 | Lee et al. | 382/274 |
| 7,835,594 B2* | 11/2010 | Riley et al. | 382/299 |
| 7,936,949 B2* | 5/2011 | Riley et al. | 382/299 |
| 8,131,109 B2* | 3/2012 | Kim et al. | 382/274 |

OTHER PUBLICATIONS

"Image Fusion using the Intensity Mapping Function," Apple Inc. Mar. 9-12, 2012. pp. 1-41.

Gallo, Orazio, Natasha Gelfand, Wei-Chao Chen, Marius Tico and Kari Pulli. "Artifact-free High Dynamic Range Imaging." Nokia Research Center. Palo Alto, CA. pp. 1-7.

Gossberg, Michael D. and Shree K. Nayar. "Deterrming the Camera Response from Images: What is Knowable?" IEEE Transactions on Pattern Analysis and Machine Intelligence, vol. 25, No. 11. Nov. 2003 pp. 1465-1467.

Hossain, Imtiaz and Bahadir K. Gunturk. "High Dynamic Range Imaging of Non-Static Scenes." Dept. of Electrical and Computer Engineering—Louisiana State University. Baton Rouge, LA. pp. 1-8.

Neemuchwala, Huzefa and Alfred Hero. "Entropic Graphs for Registration." Jun. 1, 2004. pp. 1-49.

Rao, Ch. Venkateswara, K.M.M. Rao, A.S. Manjunath and R.V.N. Srinivas. "Optimization of Automatic Image Registration Algorithms and Characterization." National Remote Sensing Agency: Hyderabad, India. pp. 1-6.

Saleem, Amina, Azeddine Beghdadi and Boualem Boashash. "Image Fusion-Based Contrast Enhancement." EURASIP Journal on Image and Video Processing 2012, 2012:10, http://www.springeropen.com pp. 1-55.

(Continued)

*Primary Examiner* — Anh Do
(74) *Attorney, Agent, or Firm* — Wong, Cabello, Lutsch, Rutherford & Brucculeri, LLP

(57) ABSTRACT

Techniques to improve image fusing operations using intensity mapping functions (IMFs) are described. In one approach, when a reference image's pixel values are within its' IMF's useful range, they may be used to generate predicted secondary image pixel values. When the reference image's pixel values are not within the IMF's useful range, actual values from a captured secondary image may be used directly or processed further to generate predicted secondary image pixel values. The predicted and actual pixel values may be used to construct predicted secondary images that may be fused. In another approach, the consistency between pixel pairs may be used to generate consistency-based weighting factors that may be used during image fusion operations.

38 Claims, 7 Drawing Sheets

(56) References Cited

OTHER PUBLICATIONS

Wong, Alexander and William Bishop. "Efficient Least Squares Fusion of MRI and CT Images Using a Phase Congruency Model." www.sciencedirect.com Oct. 11, 2007. pp. 1-8.

Yao, W., Z. G. Li and S. Rahardja. "Intensity Mapping Function Based Weighted Frame Averaging for High Dynamic Range Imaging." Signal Processing Dept., Institute for Infocomm Research: Singapore. pp. 1-4, 2011.

* cited by examiner

IMAGE FUSION USING INTENSITY MAPPING FUNCTIONS

BACKGROUND

This disclosure relates generally to the field of image processing. More particularly, this disclosure relates to techniques to combine or fuse multiple images to generate a single (composite) output image using intensity mapping functions.

Stand-alone cameras and other electronic devices having image capture capability (e.g., mobile telephones and tablet computer systems) are able to capture multiple, successive images of a scene. These captures can occur under various conditions. For example, a camera can be used to capture a sequence of images taken at the same exposure, a sequence of images taken at different exposures, two consecutive images using different capture parameters (e.g., one captured with a flash, the other without the flash), etc. Further, multiple imaging devices each employing a different sensor may also be used in the capture process.

Once such images are in hand, one objective can be to combine or fuse them to produce an agreeable image that achieves a desired objective. Examples include, but are not limited to, fusing information from multiple images to reduce image noise or to produce a new high dynamic range (HDR) image with a wider dynamic range than any of the single images, and to improve picture detail in low light conditions such as in a flash/no flash image capture pair. Inherent in each of these examples is the existence of a time delay between successive image captures. Because of this, a common, re-occurring issue manifests itself: local motion. Local motion may express itself as blurring or ghosting in fused images.

SUMMARY

In one embodiment, the inventive concept provides a method to fuse images based on using an intensity mapping function to generate a predicted image. One such method includes obtaining first and second images (generally of the same scene such as during high dynamic range image capture). Next, an intensity mapping function (having, for example, a low cut-off point) for the two images may be obtained. The intensity mapping function may be used to generate predicted second image pixel values whenever the first image's pixel values are greater than the intensity mapping function's low cut-off. Whenever the first image's pixel values are less than or equal to the intensity mapping function's low cut-off, alternative means are needed to provide pixel values for the predicted second image. One approach simply uses the corresponding pixel values from the second image. Another approach uses patch-matching techniques to provide the needed pixel values. Once the pixel values for the predicted second image have been generated, the first and predicted second images may be fused in any desired manner. In another embodiment, the first and second images may be obtained as part of an auto-exposure bracketing operation. Such operations may also provide additional images. In such cases, additional intensity mapping functions may be obtained and used to generate additional predicted images. In the end, one captured image (aka, a reference image) and each of the predicted images may be fused. In still another embodiment, the disclosed methods may be embodied in computer executable code. Such code may be stored in non-transitory computer readable memory and, in another embodiment, incorporated within an electronic device.

In another embodiment, the inventive concept provides a method to use intensity mapping functions to generate weighting factors that may be used during the image fusion process. One method employing this approach obtains first and second images and an associated intensity mapping function. The intensity mapping function may be used to generate predicted pixel values for one of the images which, when compared to that image's actual pixel values, can yield a consistency measure for each pixel of that image. The consistency measures may, in turn, be used to generated consistency-based weighting factors. The weighting factors may be used to fuse the corresponding pixels in the first and second images. In another embodiment, a third image may be obtained (such as during high dynamic range image capture) and the same process used to generate a second set of consistency-based weighting factors. Methods disclosed in accordance with this approach may be embodied in computer executable code, stored in a non-transitory computer readable memory and, executed by one or more processors (such as may be present in electronic devices).

DETAILED DESCRIPTION

Figure 1:
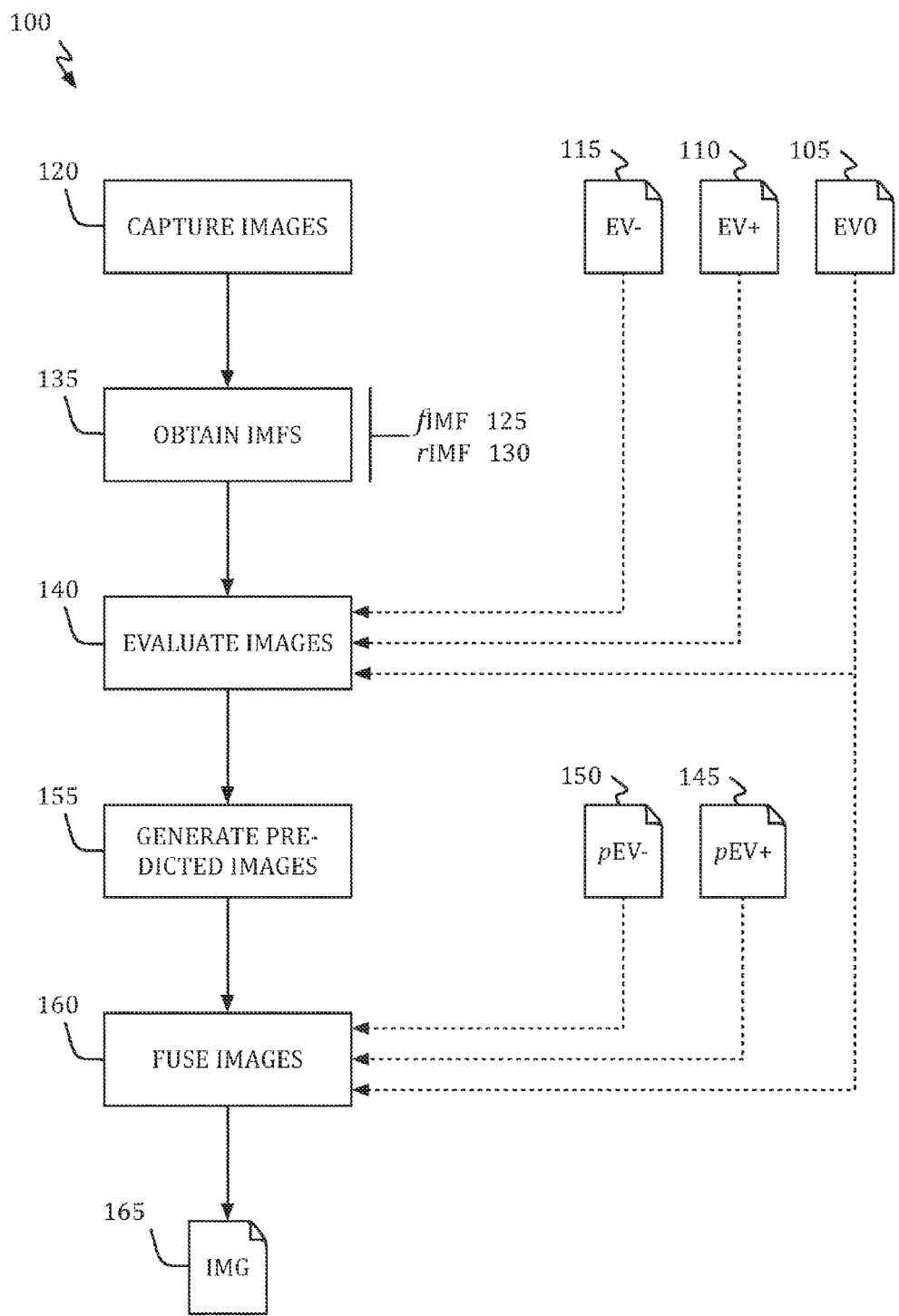
FIG. 1 shows, in flowchart form, an image capture and fusion operation in accordance with one embodiment.

This disclosure pertains to systems, methods, and computer readable media for using intensity mapping functions (IMFs) during image fusion operations. In one embodiment, when a reference image's pixel values are within the IMF's useful range, they may be used to generate predicted secondary image pixel values. When the reference image's pixel values are not within the IMF's useful range, actual values from a captured secondary image may be used to generate predicted secondary image pixel values. Together, the predicted and actual pixel values may be used to construct a predicted secondary image. When fused, the resulting image may be devoid of ghosting artifacts caused by relative motion between the reference and secondary images. In another embodiment, IMFs may be used to determine weighting factors that can be used when fusing a reference and secondary images. Such factors may de-emphasize regions in the secondary images exhibiting relative motion with respect to the reference image. When the reference and secondary images are fused in accordance with the determined weighting factors, the resulting image may also be devoid of ghosting artifacts caused by relative motion between the images.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of image processing systems having the benefit of this disclosure.

The following describes various embodiments in terms of fusing images captured during auto-exposure bracketing (AEB) operations. More particularly, AEB operations may be used during high dynamic range (HDR) imaging. In order to create a high quality HDR image, the full dynamic range of a scene needs to be captured (specifically, highlight and shadow information). Unfortunately, the dynamic range of a scene often exceeds the dynamic range of an image capture device's sensor, which are typically limited to capturing 256 (for an 8-bit sensor) to 1024 (for a 10-bit sensor) levels of brightness or intensity. The most commonly employed brackets are: 2EV−, EV0, 2EV+ and 3EV−, EV0, 3EV+. As used here, EV stands for "exposure value" and refers to a combination of an image capture device's shutter speed and aperture setting. The EV0 image refers to the image captured using the exposure value determined by the device's auto-exposure (AE) mechanism. The EV+ image refers to the image captured at the AEB's higher stop (e.g., +2 or +3 relative to the EV0 image). The EV− image refers to the image captured at the AEB's lower stop (e.g., −2 or −3 relative to the EV0 image). And Referring to FIG. 1, operation 100 illustrates how multiple images may be captured and fused in accordance with one embodiment. To begin, AEB neutral image 105 (EV0) and bracket images 110 (EV+) and 115 (EV−) may be captured (block 120). Forward (fIMF 125) and reverse rIMF 130) intensity mapping functions may then be obtained (block 135). Forward intensity mapping function fIMF 125 describes a mapping from EV0 image 105 pixel values to EV+ image 110 pixel values. Similarly, reverse intensity mapping function rIMF 130 describes a mapping from EV0 image 105 pixel values to EV− image 115 pixel values. In one embodiment, fIMF 125 and rIMF 130 functions may be linear functions (i.e., functions of constant slope). For example, if EV+ image 110 is captured with an EV that is 1 stop up from that used to capture EV0 image 105, absent relative motion and noise, pixel values in EV+ image 110 should be twice that of the corresponding pixel value in EV0 image 105. As such, reverse intensity mapping function rIMF 130 may be a value 0.5. In another embodiment, fIMF and rIMF functions 125 and 130 may be determined empirically. That is, fIMF 125 may be based on the captured content of EV0 and EV+ images 105, 110 while rIMF 130 may be based on the captured content of EV0 and EV− images 105 and 115. It will be recognized that empirically determined IMFs may be generated in a number of ways. For example, comparagrams and histogram approaches may be used. It will further be recognized that IMFs may exist between luminance (luma) pixel values for two luminance images in the YUV colorspace, as well as between pixel intensity values in the red (R) channels, the green (G) channels, and the blue (B) channels for images in the RGB colorspace. Bracket images 110 (EV+) and 115 (EV−) may be evaluated based on their corresponding IMF, neutral image 105 (EV0) and knowledge about the image capture device's operational characteristics (block 140). Based on the evaluation's result, predicted bracket images 145 (pEV+) and 150 (pEV−) may be generated (block 155) and fused with neutral EV0 image 105 (block 160) to generate output fused image 165.

Figure 2A:
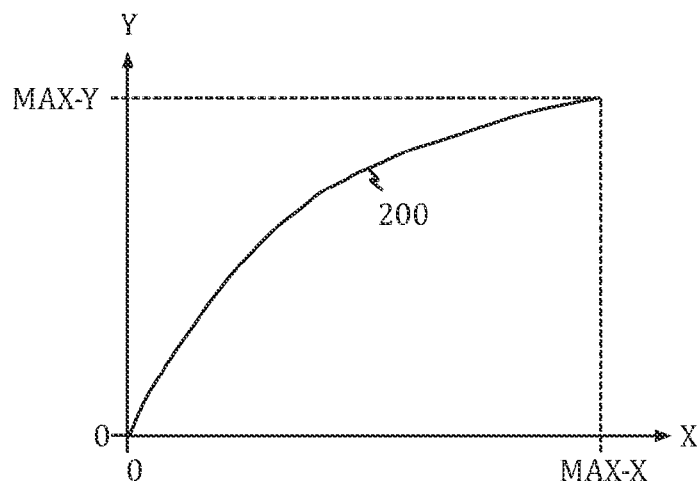
FIGS. 2A-2C show illustrative intensity mapping functions.
Figure 2B:
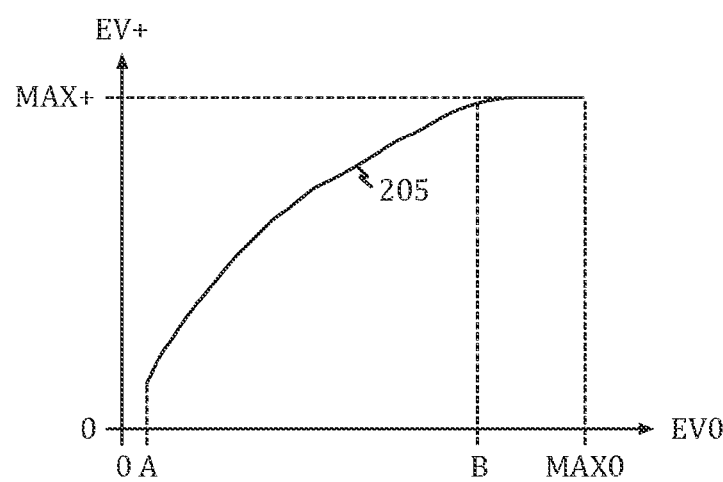
Figure 2C:
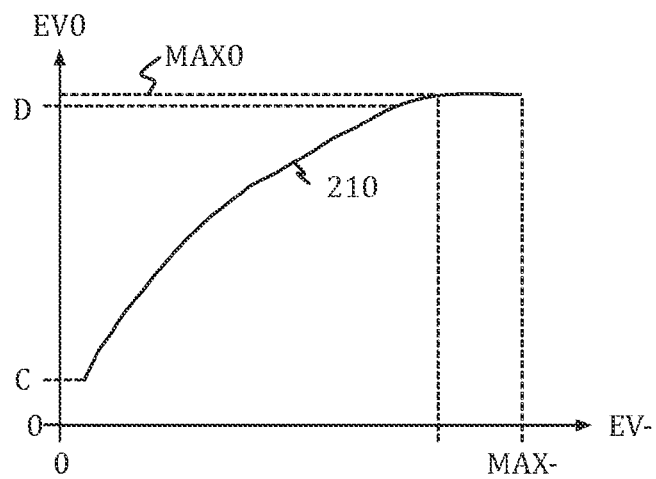

Referring to FIG. 2A, ideal IMF 200 is shown as increasing monotonically as values along the abscissa or X-axis increase from 0 to some maximum value (MAX-X), so that at an X-axis value equal to MAX-X, the corresponding ordinate or Y-axis value equals its maximum value, MAX-Y. By way of example, if an image capture device uses an 8-bit sensor, each pixel (or pixel component, e.g., R, G or B) may have a value between 0 and 255. Thus, both MAX-X and MAX-Y may equal 255. Referring now to FIG. 2B, actual forward IMF 205 uniquely maps EV0 pixel values between 'A' and 'B' to unique EV+ pixel values (i.e., every element in EV0 is paired with exactly one element of EV+). Below an EV0 pixel value of A, fIMF 205 is undefined; that is, the mapping between EV0 pixel values and EV+ pixel values is one to many and may leave a "guard band" to account for the following factors: sensor non-linearity, a pre-applied tone curve and noise. Above an EV0 pixel value of B, fIMF 205 can leave a similar "guard band" for the factors just cited. As a consequence, forward IMF 205 cannot be used to predict EV+ pixel values when EV0 values are less than A or greater than B. It will be recognized that during forward mapping operations, the image capture device's exposure values are being increased. As such, it is only the EV0 pixel values around the low-end cut-off value 'A' that are significant (i.e., pixels in EV0 that are already blown out high will continue to be blown out high in the EV+ image). Hence, the "guard band" for B may be ignored or set to MAX0, and forward IMF 205 may then be applied to EV0 pixel values greater than B. Referring next to FIG. 2C, reverse IMF 210 maps EV− pixel values to EV0 pixel values. As shown, EV0 pixel values greater than 'C' and less than 'D' correspond to unique EV− pixel values. As with fIMF 205, when EV0 pixel values are below C or greater than D, no unique EV− pixel value may be discerned and, as a consequence, rIMF 210 cannot be used to predict EV− values when EV0 values are less than C or greater than D. It will also be recognized that during reverse mapping operations, the image capture device's exposure values are being decreased. As such, it is only the EV0 pixel values around the high-end-cutoff value 'D' that are significant. (i.e., pixels in EV0 that are already blown-out low will continue to be blown-out low in the EV− image). In practice, values for A, B, C and D may vary from implementation to implementation—generally subject to the particular image capture system used. For example, in a very low noise device using an 8-bit sensor, A and C may be set to 2 or 3 while B and D may be set to 254 or 255 (for an 8-bit image sensor). In an image capture device exhibiting more noise, low cut-off values A and C may be set to 8-10 and high cut-off values B and D to 250. It should be recognized that cut-off values A, B, C and D may be set in accordance with design goals or empirically determined. Further, each of A, B, C and D may be different.

Figure 3:
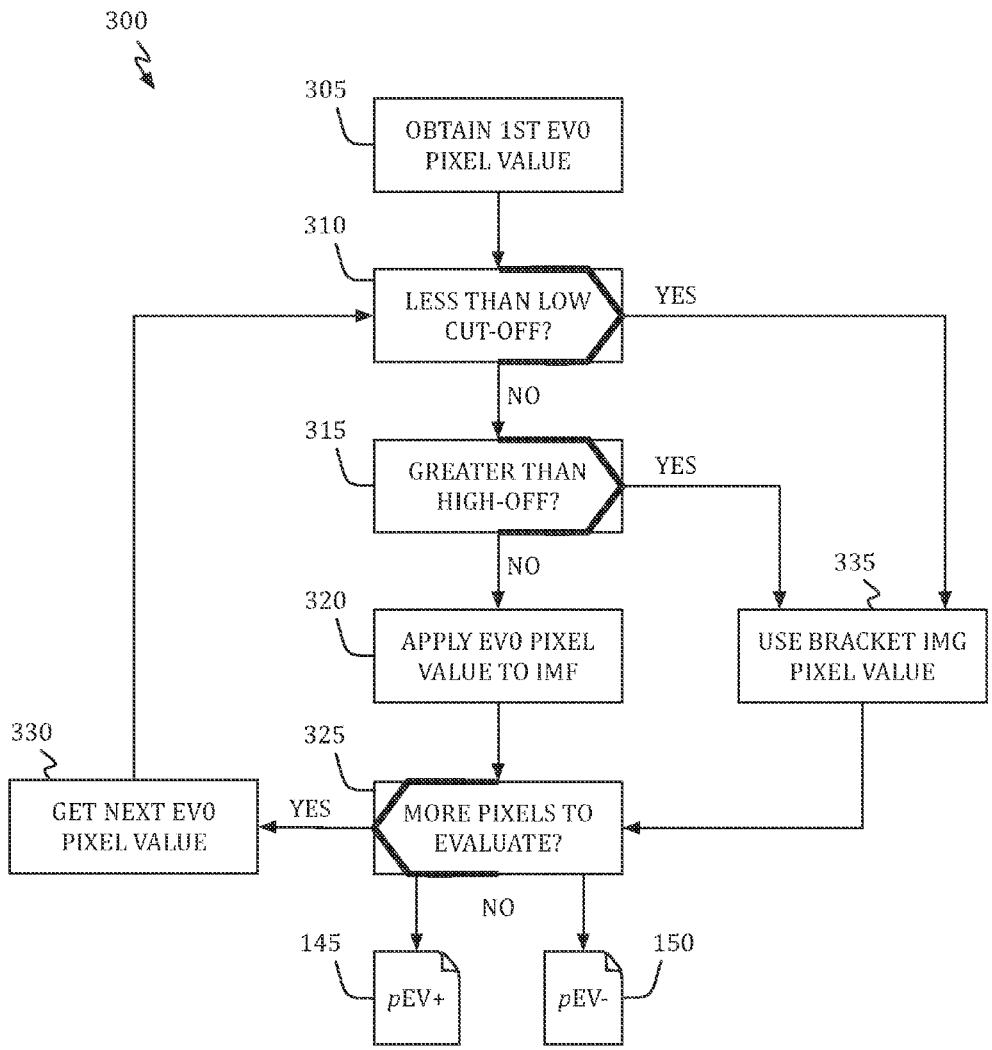
FIG. 3 shows, in flowchart form, an image evaluation and predicted image generation operation in accordance with one embodiment.

Referring to FIG. 3, image evaluation and predicted image generation function 300 begins by selecting a first pixel value from neutral or reference EV0 image 105 (block 305). A check may then be made to determine if the selected pixel's value is below that which the relevant IMF (i.e., fIMF 125 or rIMF 130) can provide a 1:1 mapping (block 310). Referring to FIGS. 2B and 2C, this could correspond to a value of A or C depending on whether fIMF 125 or rIMF 130 is being evaluated. As noted above, in practice it may only be necessary to check low-end pixel values when considering the forward mapping case: EV0→EV+. A similar check may be made to determine if the selected EV0 pixel's value is greater than that which the relevant IMF can provide a 1:1 mapping (block 315). Again, in practice it may only be necessary to check high-end pixel values when considering the reverse mapping case: EV0→EV−. Turning again to FIGS. 2B and 2C, this could correspond to a value of B or D depending on whether fIMF 125 or rIMF 130 is being evaluated. If the selected EV0 pixel's value is greater than (or equal to) the relevant IMF low cut-off value (the "NO" prong of block 310) and is further less than (or equal to) the relevant IMF high cut-off value (the "NO" prong of block 315), the EV0 pixel value may be applied to the relevant IMF to generate a predicted pixel value (block 320). This value may be retained as the value for the corresponding pixel in the relevant predicted bracket image (pEV+ 145 or pEV− 150). A further check may be made to determine if all pixels in reference EV0 image 105 have been processed (block 325). If there remain EV0 pixels to evaluate (the "YES" prong of block 325), the next EV0 pixel value may be obtained (block 330), where after operation 300 continues at block 310.

In one embodiment, if the selected EV0 pixel value is less than the relevant IMF low cut-off (the "YES" prong of block 310) or is greater that the relevant IMF high cut-off (the "YES" prong of block 315), the corresponding pixel's value from the relevant bracket image (EV+ image 110 or EV− image 115) may be retained in the predicted bracket image (block 335). In another embodiment, rather than using the relevant bracket image's pixel value as discussed here with respect to block 335, image completion or in-painting algorithms (patch matching) may be applied. (See discussion below.) Such approaches may reduce ghosting artifacts better than simply using the relevant bracket image's pixel value.

Operations in accordance with FIGS. 1 and 3 permit multiple images to be fused while eliminating (or significantly mitigating) the effect of relative motion between the two. This can result in fused images that do not exhibit ghosting artifacts. By way of example, operation 100 may be applied to only two images, or to 3 or more images.

In summary, operations in accordance with FIGS. 1 and 3 evaluate a reference image relative to one or more secondary images. When a reference image's pixel value is within a range of values that permit an intensity mapping function to provide a one-to-one mapping, the reference image's pixel value may be applied to the IMF to generate a predicted secondary image pixel value. Such a value represents the secondary image's content as it would appear without relative motion between itself and the reference image. When an IMF cannot provide a one-to-one mapping between reference image's pixel value and a secondary image pixel value, predicted secondary image pixel values may be generated in part by the corresponding secondary image's pixel value and/or additional image processing techniques such as, for example, patch matching. In one embodiment, for example, when the IMF cannot provide a suitable value, the pixel value from the secondary image may be used. This may produce acceptable results if there is no (or very little) relative motion between the two images If there are, this approach may yield ghosting. In another embodiment, when the IMF cannot provide a suitable value, the pixel value from the value predicted by the IMF may be checked for consistency with the existing secondary image pixel. If they are consistent, the secondary image pixel may be used. If they are not consistent, additional image processing techniques such as patch matching may be used. Here, "consistent" means that the secondary image's pixel's predicted value is approximately equal to the image's actual pixel value. This, in turn, may be determined in a number of ways. One way would be to take the absolute difference in the two pixels' values (or the square or their difference). If the resulting value is less than a specified threshold, the two pixels may be considered consistent. One of ordinary skill in the art will recognize that the precise threshold chosen may be a factor of the image capture device and/or other system constraints.

In another embodiment, IMFs may be used to determine weighting factors that can be used when fusing a reference and one or more secondary images. More particularly, IMFs may be used to determine how consistent pixels are between two images. The more consistent the two pixels, the larger the weighting factor used to combine or fuse the pixels during output image generation. The less consistent the two pixels, the smaller the weighting factor. Weighting factors determined in accordance with this approach tend to de-emphasize regions (pixels) in the two images exhibiting relative motion. As in the prior described approaches, images fused using weighting factors determined in accordance with this approach may also be devoid of ghosting artifacts.

As a preliminary matter, it will be recognized that conventional fusion operations may be described as follows:

$$p^{out}=\omega^- p^- + \omega^0 p^0 + \omega^+ p^+|_{over\ all\ pixels}, \quad \text{EQ. 1}$$

where $p^{out}$ represents the (fused) output pixel value, $p^0$ represents a pixel value from the reference or EV0 image, $p^-$ represents a pixel value from the EV− image corresponding to the $p^0$ pixel, $p^+$ represents a pixel value from the EV+ image corresponding to the $p^0$ pixel, and $\omega^0$, $\omega^-$ and $\omega^+$ represent prior art weighting factors. Weighting factors $w^0$, $\omega^-$ and $\omega^+$ are generally a function of the pixels' value (e.g., luminosity or intensity). For example, if a pixel may take on the values 0→255, values in the middle of this range may be given a higher weight than values at either end. Prior art weighting factors $\omega^0$, $\omega^-$ and $\omega^+$ may also incorporate image capture device noise characteristics.

It has been found that when the images being fused are substantially similar (such as in the case of HDR operations), consistency metrics may be used to generate another set of weighting factors that can result in unexpectedly robust and high quality output images. Fusion operations in accordance with this embodiment may be represented as follows:

$$p^{out}=\omega_c^-(p^0,p^-)\omega^- p^- + \omega^0 p^0 + \omega_c^+(p^0,p^+)\omega^+ p^+|_{over\ all\ pixels}, \quad \text{EQ. 2}$$

where $\omega_c^-(p^0, p^-)$ represents a consistency-based weighting factor for combining pixels in the EV0 image with the EV− image, $\omega_c^+(p^0, p^+)$ represents a consistency-based weighting factor for combining pixels in the EV0 image with the EV+ image, and $p^0$, $p^-$, $p^+$, $\omega^0$, $\omega^-$ and $\omega^+$ are as described above.

Figure 4:
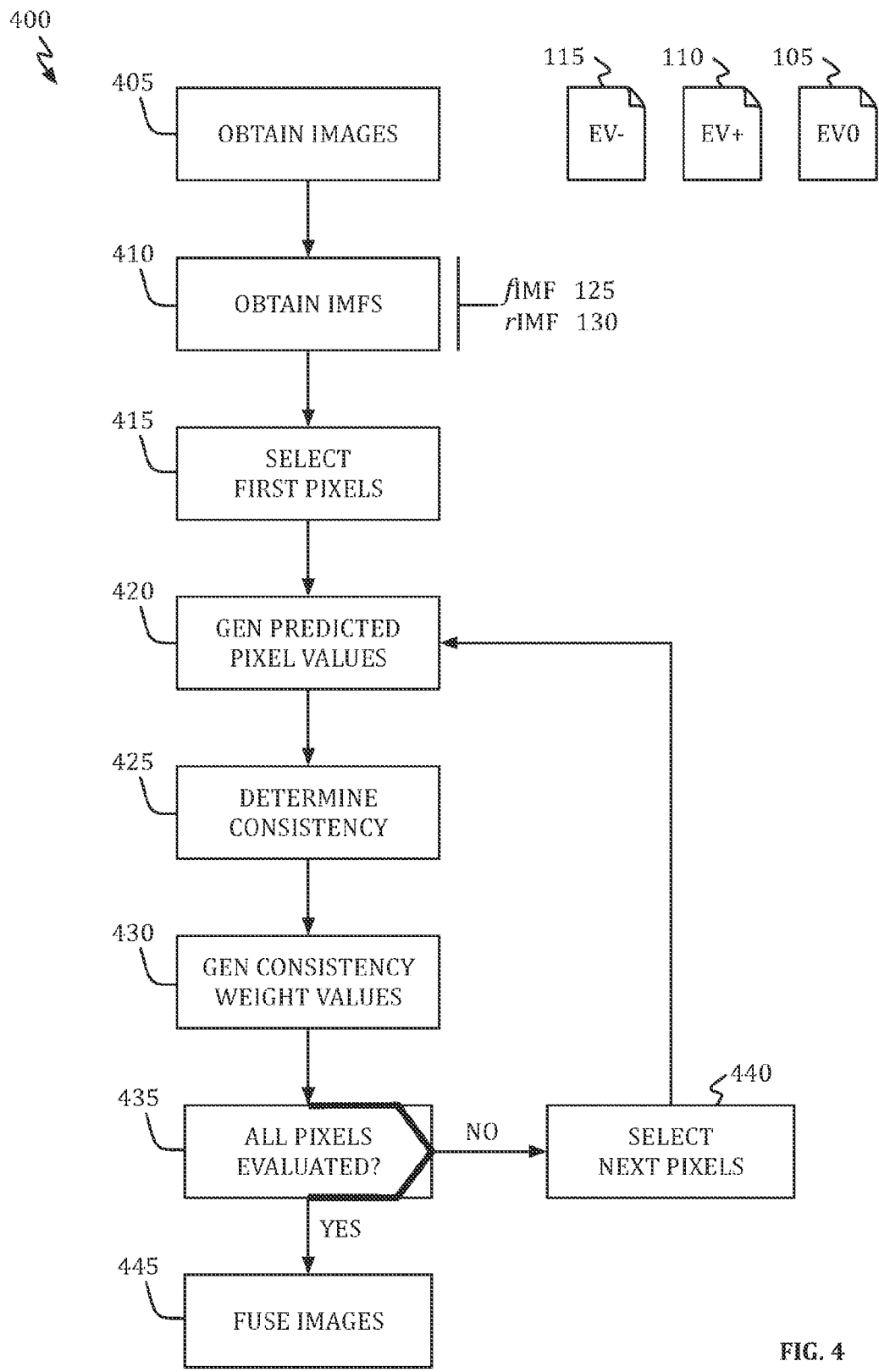
FIG. 4 shows, in flowchart form, an image fusion weighting factor generation operation in accordance with one embodiment.

Referring to FIG. 4, consistency weighting factor determination operation 400 in accordance with one embodiment begins by obtaining images (block 405), e.g., EV0 105, EV+ 110 and EV− 115 images. Next, forward 125 and reverse 130

IMFs may be obtained (block 410), and a set of first pixels selected (block 415). For example, a first pixel value $p_1^0$ from the EV0 image and the corresponding pixel values from the EV+ and EV− images, $p_1^+$ and $p_1^-$. The $p_1^0$ value may be applied to fIMF 125 to generate a predicted EV+ pixel value $\hat{p}_1^+$, and the $p_1^-$ value may be applied to rIMF 130 to generate a predicted EV0 pixel value $\hat{p}_1^0$ (block 420). The consistency or similarity between the predicted and actual pixel values may be determined (block 425) and used to generate consistency weighting factors for each pixel (block 430). A check may then be performed to determine if all pixels in the EV0, EV+ and EV− images have been evaluated in accordance with blocks 420-430 (block 435). If pixels remain to be processed (the "NO" prong of block 435), a next set of pixels may be selected (block 440), where after operation 400 continues at block 420. If all pixels have been processed (the "YES" prong of block 435), the generated consistency weighting factors may be used to fuse the images (block 445). In another embodiment, the currently selected pixels may be fused immediately following the acts of block 430. In this way a fused output image may be built up pixel-by-pixel as operation 400 progresses.

Figure 5:
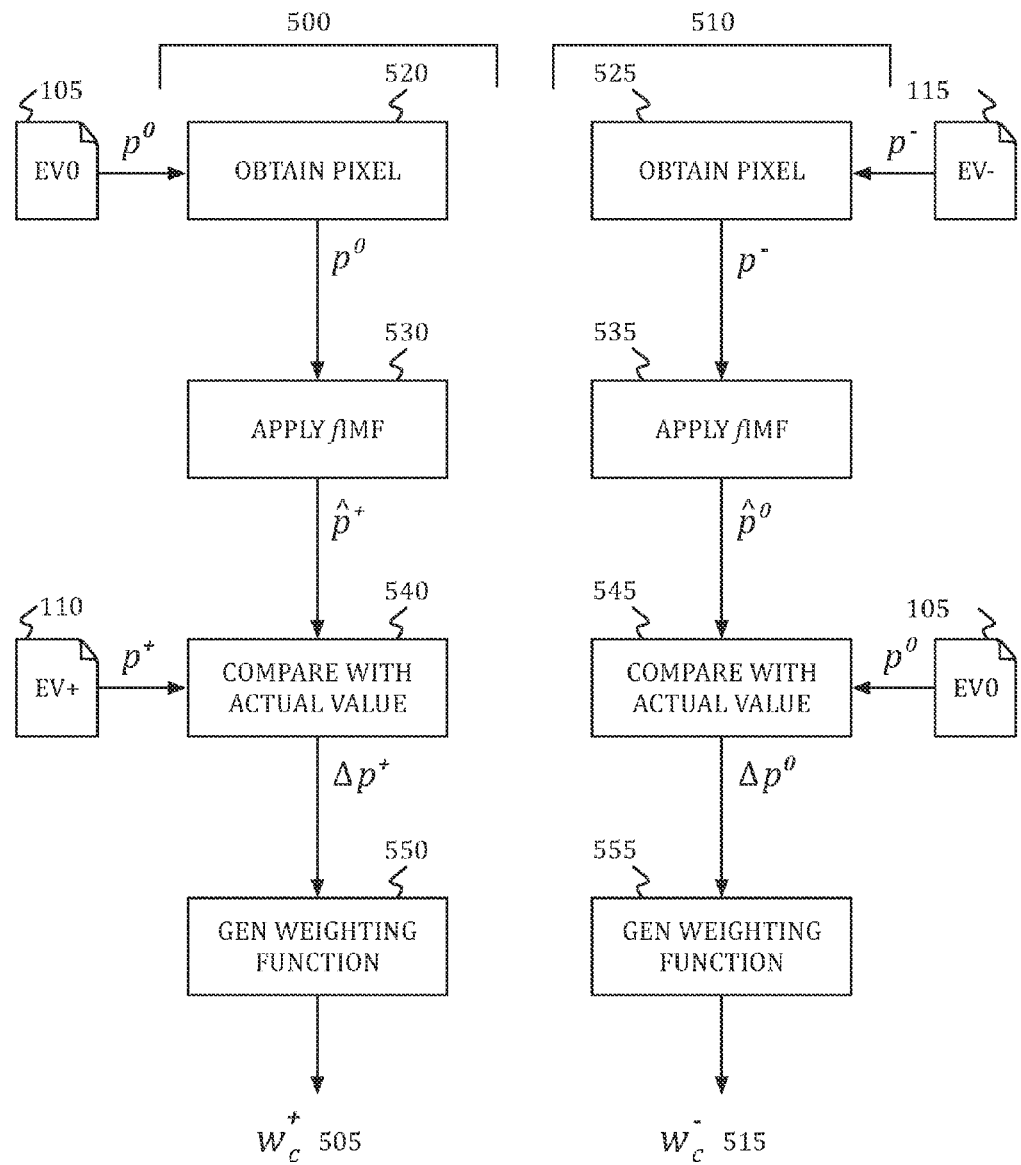
FIG. 5 shows, in flowchart form, the generation of consistency-based weighting factors in accordance with one embodiment.

Operations in accordance with one embodiment of blocks 420-430 are shown in more detail in FIG. 5. There, routine 500 is directed toward generating consistency-based weighting factor $\omega_c^+$ 505 (applied to pixels from EV+ image 110 during fusion in accordance with block 445). Routine 510 is directed toward generating consistency-based weighting factor $\omega_c^-$ 515 (applied to pixels from EV− image 115 during fusion in accordance with block 445). To begin, $p^0$ and $p^-$ pixels may be obtained (blocks 520 and 525) and applied to the appropriate IMF (blocks 530 and 535) to generate predicted values $\hat{p}^+$ and $\hat{p}^0$. The values so determined may be compared against the actual values of the corresponding pixels from the EV+ and EV0 images (blocks 540 and 545) to generate difference values $\Delta p^+$ and $\Delta p^0$. In one embodiment, compare actions 540 and 545 may be a simple absolute difference between the relevant pixel values: $|p^+ - \hat{p}^+|$ and $|p^0 - \hat{p}^0|$. In another embodiment, compare actions 540 and 545 may use a difference-squared operator: $(p^+ - \hat{p}^+)^2$ and $(p^0 - \hat{p}^0)^2$. It will be understood by those of ordinary skill in the art that many other, different, operators may be used. It should be noted that the $\Delta p^+ (\Delta p^0)$ value represents how similar or consistent the two pixel values are. For example, if the $p^+$ and $\hat{p}^+$ pixel values are precisely equal, this means that the EV0 and EV+ images are identical (after taking into account the difference in exposure values). If, on the other hand, the $p^+$ and $\hat{p}^+$ pixel values are very different, this means that there is very little consistency between the two (e.g., relative motion exists).

The $\Delta p^+$ and $\Delta p^0$ values may be used directly to determine consistency-based weighting factors 505 and 510. In one embodiment, $\Delta p^+$ and $\Delta p^0$ values may be applied to a Gaussian distribution such as:

$$\omega_c^+ = a \exp\left(\frac{-\Delta p^+}{\sigma_1}\right) \text{ and} \qquad \text{EQ. 3}$$

$$\omega_c^- = b \exp\left(\frac{-\Delta p^0}{\sigma_2}\right), \qquad \text{EQ. 4}$$

where a, b, $\sigma_1$ and $\sigma_2$ are tuning parameters that may be adjusted by the developer to attain their desired goals. In another embodiment, $\Delta p^+$ and $\Delta p^0$ values may be used as follow:

$$\omega_c^+ = \frac{c}{\Delta p^+} \text{ and} \qquad \text{EQ. 5}$$

$$\omega_c^- = \frac{d}{\Delta p^0}, \qquad \text{EQ. 6}$$

where c and d are tuning parameters. In practice, any monotonically decreasing function may be used. Whatever functional relationship is chosen, it should yield a smaller weighting factor the less consistent the two pixels are (e.g., the larger the value of $\Delta p^+$ and $\Delta p^0$.

Figure 6:
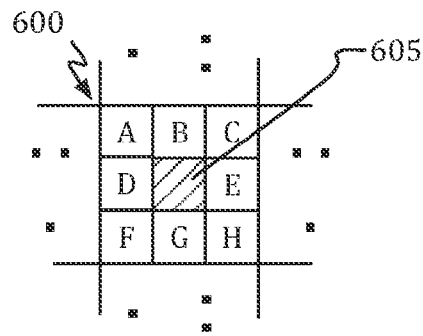
FIG. 6 shows how a pixel neighborhood may be used in accordance with one embodiment.

Rather than process single pixel values as described, pixel neighborhoods may be used. Referring to FIG. 6, in one embodiment neighborhood 600 may be used to "adjust" the value of pixel 605—where pixel 605 represents the pixel selected in accordance with FIGS. 4 and 6. In one embodiment, the sum of each neighborhood pixel (e.g., pixels A, B, C, D, E, F, G, H and 605) may be used when it is pixel 605 being selected (e.g., during block 415, 440, 520, 525, 540 and 545). In another embodiment, the mean or median of pixel values in 605's neighborhood 600 may be used. In still another embodiment, the maximum of the values in neighborhood 600 may be selected. In another embodiment, the minimum of the values in neighborhood 600 may be selected. In yet other embodiments, neighborhoods other than square neighborhoods may be selected. In addition, where neighborhood pixels do not exist because the selected pixel is along an image's border, contribution from such pixels may be ignored or, alternatively, values from those neighborhood pixels that do exist may be reflected across the image's border.

Figure 7A:
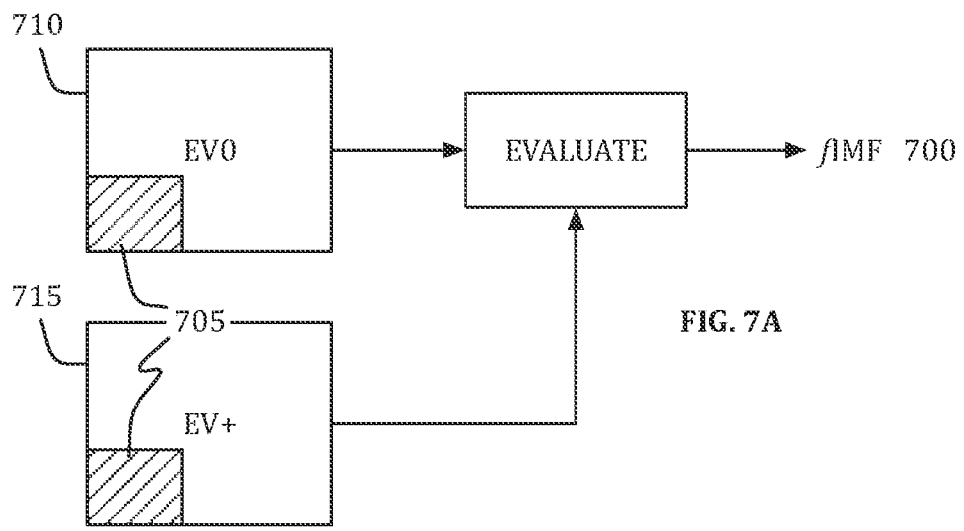
FIGS. 7A and 7B show, schematically, how intensity mapping functions may be adapted to account for inconsistent regions in accordance with one embodiment.
Figure 7B:
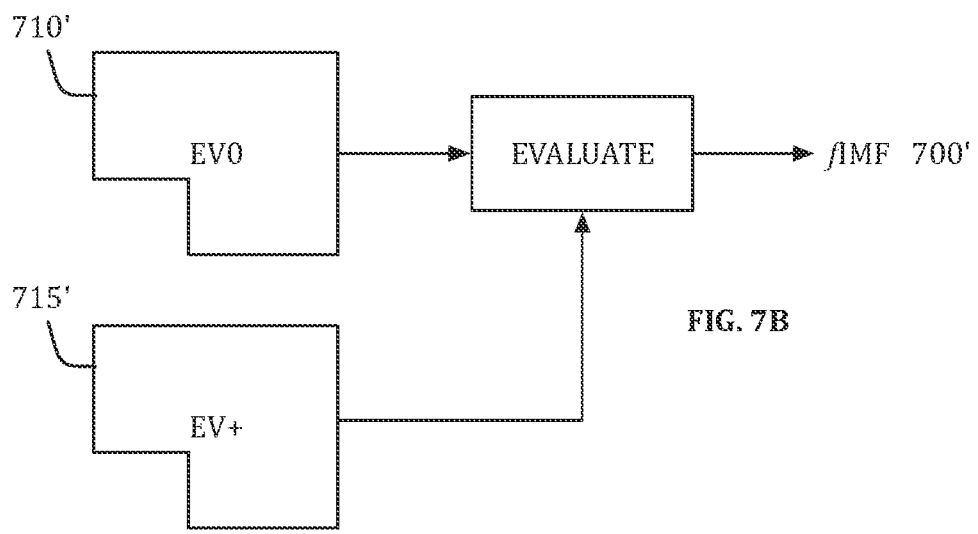

During consistency-based weighting factor operations it may be determined that one or more regions in image pairs EV0/EV+ and EV−/EV0 are inconsistent. Referring to FIG. 7A for example, it may be determined during generation of fIMF 700 that region 705 between EV0 image 710 and EV+ image 715 are inconsistent (i.e., their pixel values differ by more than a specified amount or threshold value). It has been found that when this is the case the empirically generated intensity mapping function may be "skewed." Further, the more inconsistent pixels in region 705 are, the more skewed the IMF may become. It has also been found that when inconsistent pixels are ignored when determining an IMF, the quality of the resulting weighting factors (and therefore the fused output image) may be unexpectedly improved. This situation may be seen in FIG. 7B where fIMF 700' was generated using EV0 image 710' (image 710 with pixels from region 705 removed) and EV+ image 715' (image 715 with pixels from region 705 removed).

Figure 8:
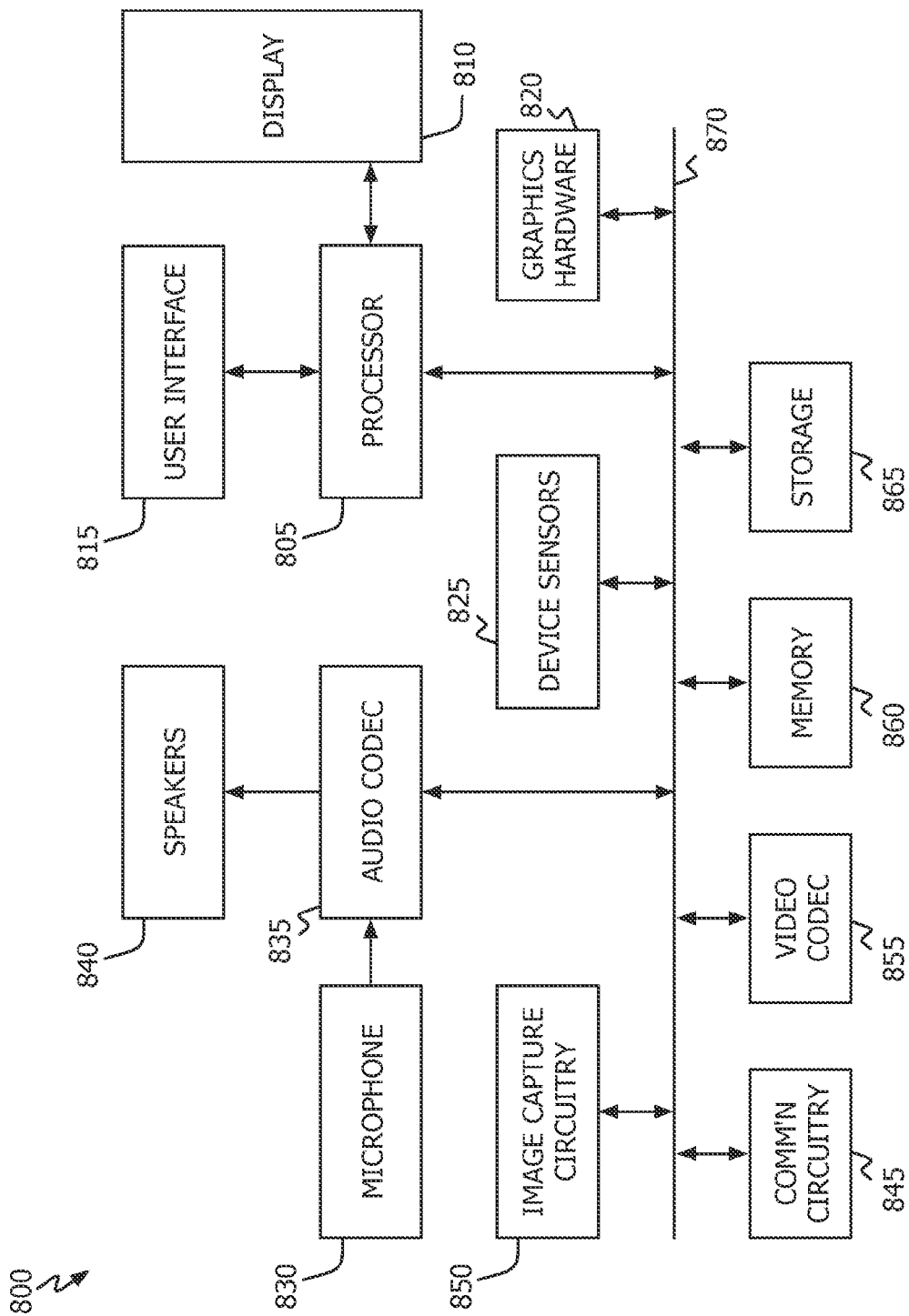
FIG. 8 shows, in block diagram form, an electronic device in accordance with one embodiment.

Referring to FIG. 8, a simplified functional block diagram of illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a personal digital assistant (PDA), personal music player, a mobile telephone, or a workstation, desktop, notebook, laptop or tablet computer system. An accurate IMF, robust to inconsistent pixels may be found in an iterative manner. A first estimate of the IMF may be found based on examining all corresponding image pixels in the two images. This IMF estimate, together with corresponding pixel values in the two images may be used to detect inconsistent pixels. These pixels can then excluded and a second estimate of the IMF using only consistent pixels obtained. This process can be repeated for a small number of fixed iterations, or until the estimated IMF converges to fixed value.

Processor 805 may execute instructions necessary to carry out or control the operation of many functions performed by device 800 (e.g., such as the generation and/or processing of images in accordance with this disclosure). Processor 805 may, for instance, drive display 810 and receive user input from user interface 815. User interface 815 can take a variety of forms, such as a button, keypad, dial, a click wheel, keyboard, display screen and/or a touch screen. Processor 805 may be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 process graphics information. In one embodiment, graphics hardware 820 may include a programmable graphics processing unit (GPU).

Sensor and camera circuitry 850 may capture still and video images that may be processed to generate images in accordance with this disclosure. Output from camera circuitry 850 may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805, graphics hardware 820, and image capture circuitry 850 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause the processor to:

obtain first and second images, each image having a plurality of pixels, each pixel in the first image having a corresponding pixel in the second image, wherein each pixel has a value;

obtain an intensity mapping function for the first and second images, wherein the intensity mapping function has a low cut-off value;

generate, for pixels in the first image that have a value greater than the low cut-off value, a predicted second pixel for the corresponding pixel in the second image based, at least in part, on the intensity mapping function;

generate, for pixels in the first image that have a value less than or equal to the low cut-off value, a predicted second pixel for the corresponding pixel in the second image; and fuse pixels in the first image with the corresponding predicted second pixels to generate an output image.

2. The non-transitory program storage device of claim 1, wherein the instructions to cause the processor to obtain first and second images comprise instructions to cause the processor to obtain first and second images from an auto-exposure bracketing operation.

3. The non-transitory program storage device of claim 1, wherein the instructions to cause the processor to obtain an intensity mapping function comprise instructions to cause the processor to obtain a linear intensity mapping function.

4. The non-transitory program storage device of claim 3, further comprising instructions to cause the processor to identify an empirically determined low cut-off value.

5. The non-transitory program storage device of claim 1, wherein the instructions to cause the processor to obtain an intensity mapping function comprise instructions to cause the processor to generate an intensity mapping function based, at least in part, on a first intensity histogram of the first image and a second intensity histogram of the second image.

6. The non-transitory program storage device of claim 1, further comprising instructions to cause the processor to:

obtain a third image having the plurality of pixels, wherein each pixel in the third image has a corresponding pixel in the first image and where each pixel in the third image has a value;

obtain a second intensity mapping function for the first and third images, wherein the second intensity mapping function has a high cut-off value;

generate, for pixels in the first image that have a value less than the high cut-off value, a predicted third pixel for the corresponding pixel in the third image based, at least in part, on the second intensity mapping function; and generate, for pixels in the first image that have a value greater than or equal to the high cut-off value, a predicted third pixel for the corresponding pixel in the third image.

7. The non-transitory program storage device of claim 1, wherein the instructions to cause the processor to fuse pixels in the first image with the corresponding predicted second pixels comprise instructions to cause the processor to fuse pixels in the first image with the corresponding predicted second and third pixels to generate an output image.

8. A non-transitory program storage device, readable by a processor and comprising instructions stored thereon to cause the processor to:

obtain a first image having a first plurality of pixels, wherein each pixel has a value;

obtain a second image having the first plurality of pixels, wherein each pixel in the second image has a corresponding pixel in the first image and where each pixel in the second image has a value;

obtain an intensity mapping function for the first and second images; and for each pixel in the first image—
generate a predicted second pixel for the corresponding pixel in the second image based, at least in part, on the value of the pixel in the first image and the intensity mapping function, generate a consistency value for the corresponding pixel in the second image based, at least in part, on the predicted second pixel value and the value of the corresponding pixel in the second image, generate a weighting value for the corresponding pixel in the second image based, at least in part, on the consistency value, and fuse the pixel from the first image with the corresponding pixel in the second image based, at least in part, on the weighting value.

9. The non-transitory program storage device of claim 8, wherein the instructions to cause the processor to obtain first and second images comprise instructions to cause the processor to obtain first and second images from an auto-exposure bracketing operation.

10. The non-transitory program storage device of claim 8, wherein the instructions to cause the processor to obtain an intensity mapping function comprise instructions to cause the processor to obtain a linear intensity mapping function.

11. The non-transitory program storage device of claim 8, wherein the instructions to cause the processor to obtain an intensity mapping function comprise instructions to cause the processor to generate an intensity mapping function based, at least in part, on a first intensity histogram of the first image and a second intensity histogram of the second image.

12. The non-transitory program storage device of claim 8, wherein the instructions to cause the processor to fuse the pixel from the first image with the corresponding pixel in the second image comprise instructions to cause the processor to:
generate a temporary result based, at least in part, on the value of the corresponding pixel in the second image and the weighting value; and
generate a fused output pixel based, at least in part, on the temporary result and the value of the pixel in the first image.

13. The non-transitory program storage device of claim 8, wherein the instructions to cause the processor to obtain a second image further comprise instructions to cause the processor to obtain a third image having the first plurality of pixels, wherein each pixel in the third image has a corresponding pixel in the first image and where each pixel in the second image has a value.

14. The non-transitory program storage device of claim 13, wherein the instructions to cause the processor to obtain an intensity mapping function further comprise instructions to cause the processor to obtain a second intensity mapping function.

15. The non-transitory program storage device of claim 14, wherein the instructions to cause the processor to generate a predicted second pixel value further comprise instructions to cause the processor to generate a predicted value for the pixel in the first image based, at least in part, on the value of the corresponding pixel in the third image and the second intensity mapping function.

16. The non-transitory program storage device of claim 15, wherein the instructions to cause the processor to generate a consistency value for the corresponding pixel in the second image further comprise instructions to cause the processor to generate a second consistency value for the corresponding pixel in the third image based on the predicted value for the pixel in the first image and the value of pixel in the first image.

17. The non-transitory program storage device of claim 16, wherein the instructions to cause the processor to generate a weighting value further comprise instructions to cause the processor to generate a second weighting value for the corresponding pixel in the third image based, at least in part, on the second consistency value.

18. The non-transitory program storage device of claim 17, wherein the instructions to cause the processor to fuse the pixel from the first image with the corresponding pixel in the second image comprise instructions to cause the processor to:
generate a first temporary result based, at least in part, on the value of the corresponding pixel in the second image and the weighting value;
generate a second temporary result based, at least in part, on the value of the corresponding pixel in the third image and the second weighting value; and
generate a fused output pixel based, at least in part, on the first temporary result, the value of the pixel in the first image, and the second temporary result.

19. An image fusion method, comprising:
obtaining, using an electronic device, a first image having a first plurality of pixels, wherein each pixel has a value;
obtaining, using the electronic device, a second image having the first plurality of pixels, wherein each pixel in the second image has a corresponding pixel in the first image and where each pixel in the second image has a value;
obtaining an intensity mapping function for the first and second images that has an associated low cut-off value;
generating, for each pixel value in the first image that is greater than the low cut-off value, a predicted second pixel value for the corresponding pixel from the second image based, at least in part, on the intensity mapping function;
generating, for each pixel value in the first image that is less than or equal to the low cut-off value, a predicted low pixel value for the corresponding pixel in the second image, wherein the collection of predicted second pixel values, predicted low pixel values, and predicted high pixel values comprise a predicted second image;
fusing the first and predicted second images to generate a first output image; and
storing the output image in a memory.

20. The method of claim 19, wherein the act of obtaining first and second images comprises obtaining first and second images from an auto-exposure bracketing operation.

21. The method of claim 19, wherein the act of obtaining an intensity mapping function comprises obtaining a linear function intensity mapping function.

22. The method of claim 19, further comprising:
obtaining a third image having the first plurality of pixels, wherein each pixel in the third image has a corresponding pixel in the first image and where each pixel in the third image has a value;
obtaining a second intensity mapping function that has an associated high cut-off value;
generating, for each pixel value in the first image that is less than the high cut-off value, a predicted third pixel value for the corresponding pixel in the third image based, at least in part, on the second intensity mapping function; and
generating, for each pixel value in the first image that is greater than or equal to the high cut-off value, a predicted third high pixel value for the corresponding pixel in the third image, wherein the collection of predicted third pixel values and predicted third high pixel values comprise a predicted third image.

23. The method of claim 22, wherein the act of fusing the first and predicted second images further comprises fusing the first image, predicted second image and predicted third image to generate a first output image.

24. An image fusing method, comprising:
obtaining, using an electronic device, a first image having a first plurality of pixels, wherein each pixel has a value;
obtaining, using the electronic device, a second image having the first plurality of pixels, wherein each pixel in the second image has a corresponding pixel in the first image and where each pixel in the second image has a value;
obtaining an intensity mapping function for the first and the second images; and
for each pixel in the first image—
generating a predicted second pixel value for the corresponding pixel in the second image based, at least in part, on the value of the pixel in the first image and the intensity mapping function,
generating a consistency value for the corresponding pixel in the second image based, at least in part, on the predicted second pixel value and the value of the corresponding pixel in the second image,
generating a weighting value for the corresponding pixel in the second image based, at least in part, on the consistency value, and
fusing the pixel from the first image with the corresponding pixel in the second image based, at least in part, on the weighting value.

25. The method of claim 24, wherein the act of obtaining an intensity mapping function comprises generating an intensity mapping function based, at least in part, on a first intensity histogram of the first image and a second intensity histogram of the second image.

26. The method of claim 24, wherein the act of fusing the pixel from the first image with the corresponding pixel in the second image comprises:
generating a temporary result based, at least in part, on the value of the corresponding pixel in the second image and the weighting value; and
generating a fused output pixel based, at least in part, on the temporary result and the value of the pixel in the first image.

27. The method of claim 24, wherein the act of obtaining a second image further comprises obtaining a third image having the first plurality of pixels, wherein each pixel in the third image has a corresponding pixel in the first image and where each pixel in the second image has a value.

28. The method of claim 27, wherein the act of obtaining an intensity mapping function further comprises obtaining a second intensity mapping function.

29. The method of claim 28, wherein the act of generating a predicted second pixel value further comprises generating a predicted value for the pixel in the first image based, at least in part, on the value of the corresponding pixel in the third image and the second intensity mapping function.

30. The method of claim 29, wherein the act of generating a consistency value for the corresponding pixel in the second image further comprises generating a second consistency value for the corresponding pixel in the third image based on the predicted value for the pixel in the first image and the value of pixel in the first image.

31. The method of claim 30, wherein the act of generating a weighting value further comprises generating a second weighting value for the corresponding pixel in the third image based, at least in part, on the second consistency value.

32. The method of claim 31, wherein the act of fusing the pixel from the first image with the corresponding pixel in the second image comprises:
generating a first temporary result based, at least in part, on the value of the corresponding pixel in the second image and the weighting value;
generating a second temporary result based, at least in part, on the value of the corresponding pixel in the third image and the second weighting value; and
generating a fused output pixel based, at least in part, on the first temporary result, the value of the pixel in the first image, and the second temporary result.

33. An electronic device, comprising:
a source of images;
a memory having stored therein instructions;
one or more processors communicatively coupled to the source of images and the memory, the one or more processors adapted to execute the instructions, the instructions adapted to cause the electronic device to:
obtain a first image having a first plurality of pixels, wherein each pixel has a value;
obtain a second image having the first plurality of pixels, wherein each pixel in the second image has a corresponding pixel in the first image and where each pixel in the second image has a value;
obtain an intensity mapping function for the first and the second images that has an associated low cut-off value;
generate, for each pixel value in the first image that is greater than the low cut-off value, a predicted second pixel value for the corresponding pixel from the second image based, at least in part, on the intensity mapping function;
generate, for each pixel value in the first image that is less than or equal to the low cut-off value, a predicted low pixel value for the corresponding pixel in the second image, wherein the collection of predicted second pixel values, predicted low pixel values, and predicted high pixel values comprise a predicted second image; and
fuse the first and predicted second images to generate a first output image.

34. The electronic device of claim 33, wherein the source of images comprises an image capture device.

35. The electronic device of claim 33, wherein the source of images comprises a second memory.

36. An electronic device, comprising:
a source of images;
a memory having stored therein instructions;
one or more processors communicatively coupled to the source of images and the memory, the one or more processors adapted to execute the instructions, the instructions adapted to cause the electronic device to:
obtain a first image having a first plurality of pixels, wherein each pixel has a value;
obtain a second image having the first plurality of pixels, wherein each pixel in the second image has a corresponding pixel in the first image and where each pixel in the second image has a value;
obtain an intensity mapping function for the first and the second images; and
for each pixel in the first image—
generate a predicted second pixel value for the corresponding pixel in the second image based, at least in part, on the value of the pixel in the first image and the intensity mapping function, generate a consistency value for the corresponding pixel in the second image based, at least in part, on the predicted second pixel value and the value of the corresponding pixel in the second image, generate a weighting value for the corresponding pixel in the second image based, at least in part, on the consistency value, and fuse the pixel from the first image with the corresponding pixel in the second image based, at least in part, on the weighting value.

37. The electronic device of claim 36, wherein the source of images comprises an image capture device.

38. The electronic device of claim 36, wherein the source of images comprises a second memory.

* * * * *

UNITED STATES PATENT AND TRADEMARK OFFICE
CERTIFICATE OF CORRECTION

PATENT NO.         : 8,675,964 B2                                    Page 1 of 1
APPLICATION NO.    : 13/490259
DATED              : March 18, 2014
INVENTOR(S)        : Earl Q. Wong et al.

It is certified that error appears in the above-identified patent and that said Letters Patent is hereby corrected as shown below:

On the Title Page, item (57) in the Abstract, line 4, replace "its'" with --an--.

In the Claims:
Column 12, line 2 (Claim 16, line 7), replace "value of pixel" with --value of the pixel--.
Column 12, line 42 (Claim 19, line 21), replace "comprise" with --comprises--.
Column 12, lines 20-21 (Claim 21, lines 2-3), replace "linear function" with --linear--.
Column 13, line 65 (Claim 30, line 6), replace "value of pixel" with --value of the pixel--.
Column 14, line 42 (Claim 33, line 27), replace "comprise" with --comprises--.

Signed and Sealed this
Twenty-seventh Day of May, 2014

Michelle K. Lee
*Deputy Director of the United States Patent and Trademark Office*